US007817538B2

(12) United States Patent
Balasubramanian et al.

(10) Patent No.: US 7,817,538 B2
(45) Date of Patent: Oct. 19, 2010

(54) FAULT-TOLERANT ETHERNET NETWORK

(75) Inventors: Sivaram Balasubramanian, Solon, OH (US); Anatoly Moldovansky, Pepper Pike, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 906 days.

(21) Appl. No.: 11/520,192

(22) Filed: Sep. 13, 2006

(65) Prior Publication Data

US 2008/0062864 A1  Mar. 13, 2008

(51) Int. Cl.
*G01R 31/08* (2006.01)
(52) U.S. Cl. .................. 370/218; 370/228; 370/242
(58) Field of Classification Search ......... 370/216–223, 370/225–227, 228, 242, 244, 245, 250
See application file for complete search history.

(56) References Cited

U.S. PATENT DOCUMENTS

| 5,959,968 | A | * | 9/1999 | Chin et al. ............... 370/216 |
| 6,308,282 | B1 | * | 10/2001 | Huang et al. ............... 714/4 |
| 6,581,166 | B1 | | 6/2003 | Hirst et al. |
| 6,901,443 | B1 | | 5/2005 | Huang et al. |
| 2002/0046357 | A1 | | 4/2002 | Hunag et al. |
| 2006/0067208 | A1 | | 3/2006 | Hoga et al. |
| 2006/0245454 | A1 | * | 11/2006 | Balasubramanian et al. 370/509 |

FOREIGN PATENT DOCUMENTS

| EP | 0981226 A1 | 2/2000 |
| WO | WO 99/21322 | 4/1999 |
| WO | WO 02/098059 | 12/2002 |
| WO | WO 2004/071010 | 8/2004 |

OTHER PUBLICATIONS

European Search Report for EP Application No. 07114417.4-2416, dated Jan. 11, 2008.

* cited by examiner

*Primary Examiner*—Donald L Mills
*Assistant Examiner*—Mon Cheri S Davenport
(74) *Attorney, Agent, or Firm*—Boyle Fredrickson LLP; R. Scott Speroff; John M. Miller

(57) ABSTRACT

Fault-tolerant Ethernet is provided through the use of special interfaces providing duplicate ports that may be alternatively enabled with the same network address. A switching between the ports, corrects for single faults in a two-way redundant system without time-consuming reconfiguration of other end devices or the need for complex middleware in the end devices.

17 Claims, 11 Drawing Sheets

FAULT-TOLERANT ETHERNET NETWORK

CROSS-REFERENCE TO RELATED APPLICATIONS

STATEMENT REGARDING FEDERALLY SPONSORED RESEARCH OR DEVELOPMENT

BACKGROUND OF THE INVENTION

This invention relates generally to fault-tolerant electronic communication networks, and, in particular, to a fault-tolerant network that operates rapidly to correct faults occurring when network components fail and which is suitable for real-time industrial control.

Industrial controllers are special-purpose computers that provide for real-time, highly reliable control of manufacturing equipment and machines and processes. Typically, an industrial controller executes a stored program to read inputs from the machine or process through sensors connected to the industrial controller through a set of input/output (I/O) circuits. Based on those inputs, the industrial controller generates output signals that control the machine or process through actuators or the like.

Often, the components of the industrial control system will be distributed throughout a factory and will therefore communicate over a specialized communication network that provides for high-speed operation (to allow real time control) with specialized protocols to ensure that data is reliably and predictably transmitted.

Desirably, the components of an industrial control system might be interconnected using common network components, for example, commonly available Ethernet network components. Such an ability could cut the costs of establishing and maintaining the network and in some cases would allow the use of existing network infrastructures. In addition, the ability to use a common network, such as Ethernet, could facilitate communication with devices outside of the industrial control system or that are not directly involved in the control process.

One obstacle to the adoption of Ethernet and similar standard networks is that they are not fault-tolerant, that is, failure in as little as one network component can cause the network to fail—an unacceptable probability for an industrial control system where reliability is critical.

The prior art provides several methods to increase the fault tolerance of Ethernet and similar networks. A first approach is to use a ring topology where each end device (node) is connected to the other nodes with a ring of interconnected components (such as switches) and communication media. The operation of the ring network is controlled by a ring manager device with special software. Failure of one component or media segment in the ring still provides a second path between every node. This second path is blocked by ring manager device in normal mode of operation. Upon detecting a network failure, the ring manager device will reconfigure the network to use second path. Such systems provide for a correction of a network failure on the order of 100 microseconds to 500 milliseconds. A drawback is that multiple faults (e.g. the failure of two segments of media) cannot be accommodated.

A second approach equips each node with software "middleware" that controls the connection of the node to one of two or more different networks. In the event of component or media failure, the middleware changes the local network interface to transmit and receive messages on the back-up network using a new Ethernet address. The middleware communicates with the middleware at other nodes to update this changed address. This approach can tolerate multiple faults, but the time necessary to reconfigure the network can be as much as 30 seconds. An additional problem with this latter approach is that multiple networks are needed (one for primary use and one for backup) which can be difficult to maintain, inevitably having differences in configuration and performance.

In a third approach, a single network with two or more redundant network infrastructures is used and each device is provided with multiple ports, and each port is connected to a redundant infrastructure of that network. The middleware in each device is provided with alternate paths through multiple infrastructures to all other devices in the network. The middleware in each device sends diagnostic messages on each alternate path periodically and exchanges status information for each path with middleware in all other devices continuously. When an application level message needs to be sent, the middleware in source device will pick a functioning path to target device based on current path status information. In the event of a network failure on a path, the middleware in a device will detect it either through non-reception of diagnostic messages from the other device on that path or through path status information received from the other device through an alternate path. Upon detecting path failure the status information for that path will be updated and that path will not be used for future transmissions. Such detection and reconfiguration may occur typically in less than one second.

This need to reconfigure each node when there is a network failure fundamentally limits the speed with which network failures may be corrected, both because of the need for complex software (middleware) to detect the failure and coordinate address or path status changes, and because of the time required for communication with other nodes on the network.

SUMMARY OF THE INVENTION

The present invention largely eliminates the need to reconfigure other end nodes by providing each end node with two network connections both having the same network address. One or the other network connection is activated by hardware in a network card in response to a detected failure. This hardware switching and the elimination of the need for address changes provide for failure detection and reconfiguration speeds of less than 1 millisecond even for very large networks.

Network failures may be detected using standard mechanisms of IEEE 802.3, for local failures, and by using special beacons positioned on the network so that a loss of beacon packets indicates a remote network failure. Both types of failure may be readily detected in hardware.

The single network to which the nodes are connected is configured so that there are multiple paths between each node. Preferably this is done by providing at least two backbone switches interconnected by a high reliability connection, and connecting each end node directly or indirectly to both switches.

Specifically, the present invention provides a system for creating a fault-tolerant Ethernet network of end devices, each end device connected by network switches and network media. The system includes Ethernet communications circuits associated with each end device and communicating between the host microprocessor of the end device and at least two ports having a common Ethernet address and connectable to different network media. The communication circuit switches the end device to a second of the ports upon occurrence of a fault affecting a first of the ports.

Thus, it is one object of at least one embodiment of the invention to provide for extremely fast fault correction that does not require reconfiguration of node addresses and that may be accomplished primarily with high-speed hardware.

The Ethernet communication circuit may detect a fault affecting the first of the ports by detecting a failure of Ethernet communication with a network switch communicating to the first port.

Thus, it is an object of at least one embodiment of the invention to provide for simple local fault detection using the mechanisms provided in IEEE 802.3 standard.

The system may include one or more beacons transmitting beacon packets over the network media to both the first and second ports and the Ethernet communication circuit may detect a fault affecting the first or second port by detecting non-reception of any beacon packet within a predefined timeout period at the respective port.

Thus, it is an object of at least one embodiment of the invention to provide for a comprehensive detection of faults remote from a given end device.

The beacon packet may be retransmitted at a periodic rate and the said predefined timeout period may typically be deduced as slightly more than twice the periodic rate.

It is thus an object of at least one embodiment of the invention to provide for extremely fast fault detection limited only by the speed of propagation of signals in the network yet to eliminate false fault detection.

The Ethernet communication circuit may incorporate a beacon which may be selectively actuable by a user to transmit a beacon packet over the network media to other Ethernet communications circuits.

Thus, it is another object of at least one embodiment of the invention to provide for a fault-tolerant system that may be implemented with a single specialized circuit card and in all other respects may employ standard Ethernet hardware.

The beacons may transmit at the highest priority under IEEE 802.3.

Thus, it is an object of at least one embodiment of the invention to enlist the priority structure of Ethernet to ensure extremely fast detection of faults.

The Ethernet communication circuits may broadcast a packet to other Ethernet communications circuits when the communications circuit switches between ports to promote learning by intermediary switches that use a learning protocol.

Thus, it is an object of at least one embodiment of the invention to allow intermediary switches and the like to relearn the appropriate routing for signals in the event of a fault.

The Ethernet communication circuits may employ dedicated circuitry to switch between ports.

Thus, it is an object of at least one embodiment of the invention to eliminate the need for complex software middleware, thus, to provide improved speed of switching.

The Ethernet communication circuit may be used on a network having at least two switches that are designated top-level switches and communicate with each other via a fault-tolerant backbone. Each end device may communicate directly or indirectly with the first of the top-level switches via one port and with the second of the top-level switches via a second port.

Thus, it is an object of at least one embodiment of the invention to provide a simple topology in a single network that allows fault tolerance.

The top-level switches may provide for IEEE 802.3 link aggregation capability.

Thus it is an object of at least one embodiment of the invention to provide for a reliable logical redundancy in a single network using standard Ethernet protocols and hardware.

These particular objects and advantages may apply to only some embodiments falling within the claims and thus do not define the scope of the invention.

DETAILED DESCRIPTION OF THE PREFERRED EMBODIMENT

An Industrial Control System

Figure 1:
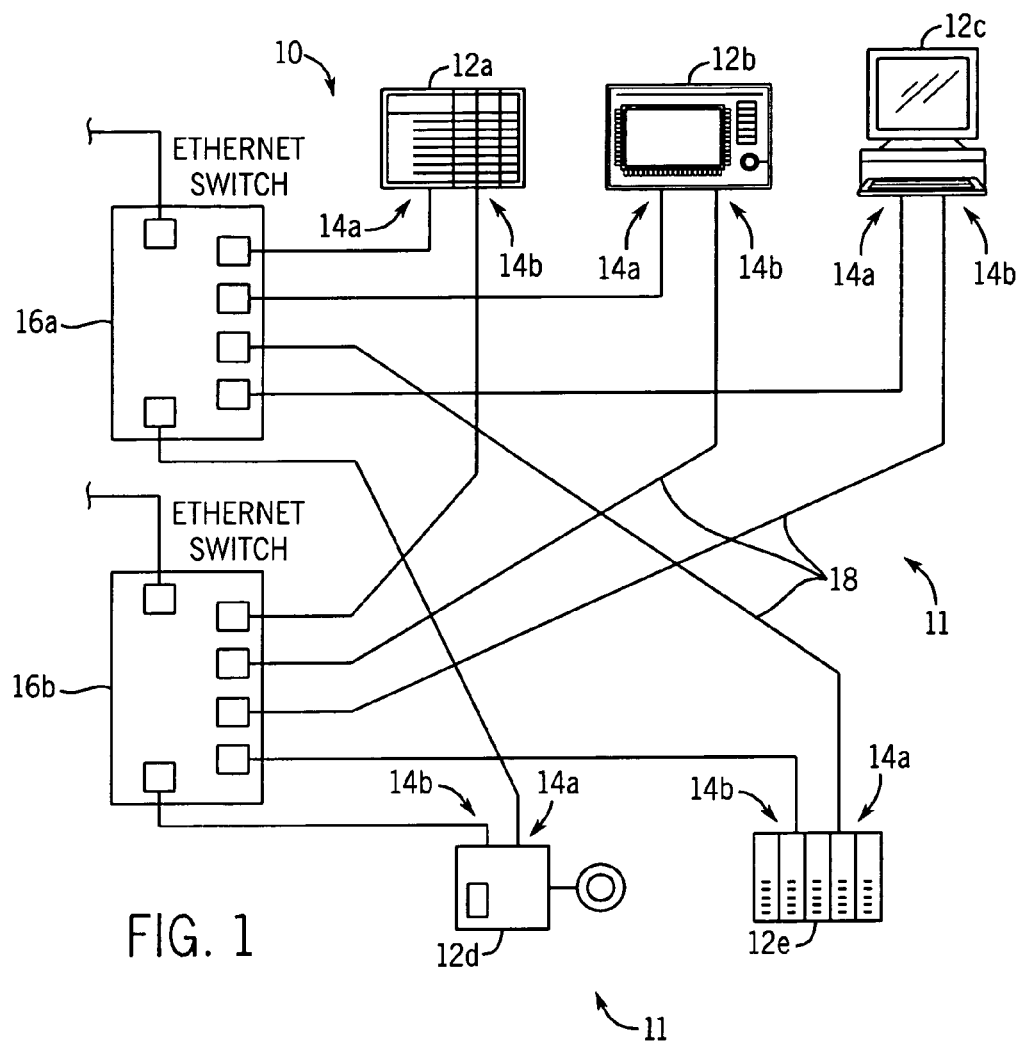
FIG. 1 is a block diagram of an industrial control system having controller and other end devices connected as nodes on an Ethernet network, each node communicating with multiple Ethernet switches.

Referring now to FIG. 1, an industrial control system 10 may include a number of end devices 12a-12e, each having two connections 14a and 14b via an Ethernet interface circuit 20 (not shown in FIG. 1) communicating respectively with different switches 16a and 16b through independent network media 18.

Together, the switches 16, the network media 18, and the Ethernet interface circuits 20 provide a fault-tolerant network 11, as will be described below.

The end devices 12a-12e may be any industrial control device such as a programmable logic controller (end device 12a), a human machine interface (end device 12b), a standard personal computer (end device 12c), a motor controller (end device 12d), and an input/output rack (end device 12e).

Each of the switches 16a and 16b may be standard Ethernet switches of a type known in the art. To the extent that the switches 16 may have IGMP snooping and filtering of Ethernet multicast addresses, this feature may be preferably deactivated to allow these switches to work more rapidly with the present invention. To the extent that the switches 16 may have "learning" and filtering of Ethernet unicast addresses, preferably, switches may provide for a configurable aging mechanism for learned addresses, however, this is not required.

The network media 18 may be, for example, electrical cable, optical fiber or wireless transmitter/receiver pairs, or the like.

The Fault-tolerant Interface Circuit

Figure 2:
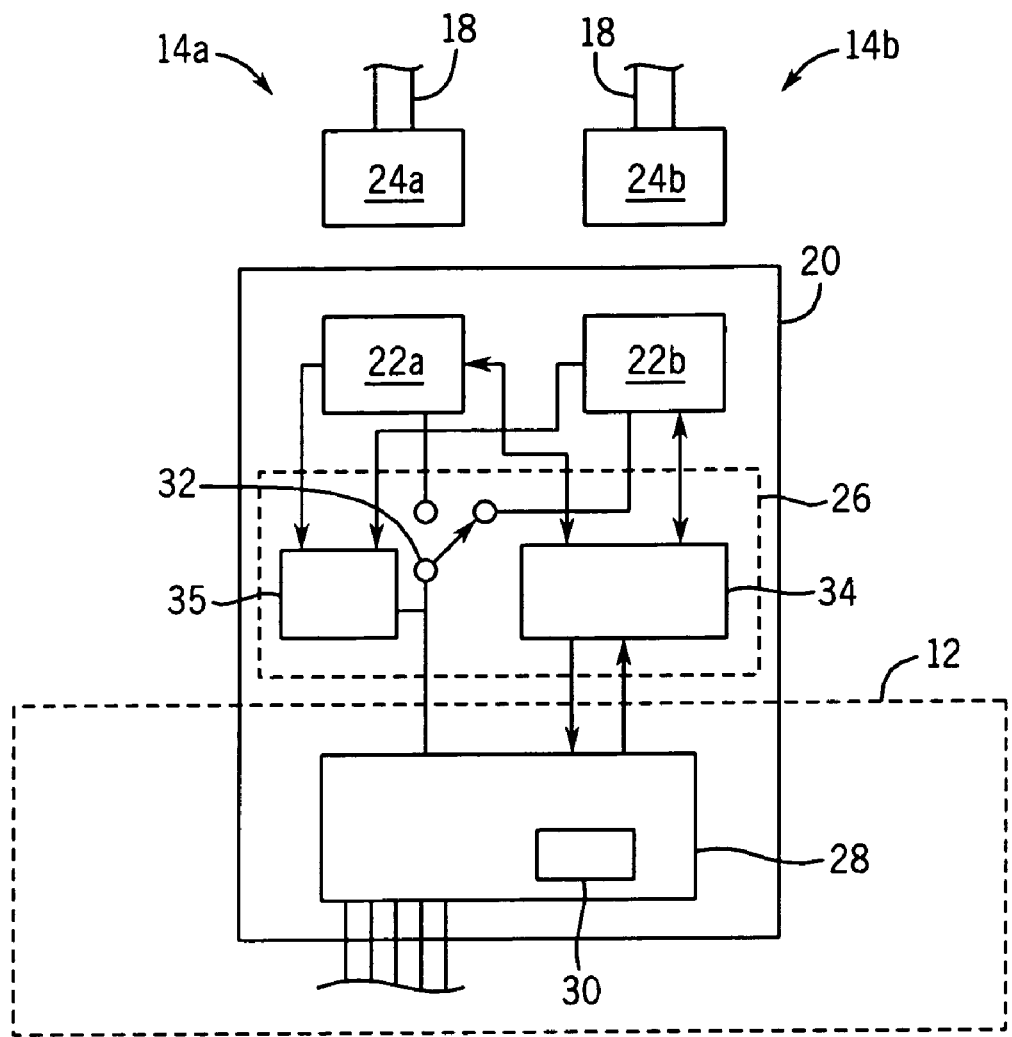
FIG. 2 is a block diagram of a communication circuit employed by the end nodes of FIG. 1 providing two ports using the same address to connect to the multiple switches and showing circuitry for switching between the two ports.

Referring now to FIG. 2, as mentioned above, each of the end devices 12 may include an Ethernet interface circuit 20 providing the two connections 14a and 14b to the rest of the network 11. The connections 14a and 14b are realized through two standard physical ports 22a and 22b accepting respectively connectors 24a and 24b attached to network media 18.

The physical ports 22a and 22b are connected to a hardware switching circuit 26, such as may be implemented, for example, using a field programmable gate array (FPGA) and/or an application-specific integrated circuit (ASIC), that provides a communication between one or the other of the ports 22a and 22b with a host microprocessor 28. In this regard, the switching circuit 26 may include a multi-line port selector 32 switching data flow from either port 22a or port 22b, depending on the state of the port selector 32, to a host microprocessor 28. A logic circuit 34 being part of the switching circuit 26 controls the port selector 32 according to state machine that generally detects faults and switches between the ports 22a and 22b. At any given time, port selector 32 enables only one port 22a and disables the other port 22b or vice versa. All communication flows only through the enabled port 22.

The host microprocessor 28 typically executes a program implementing specific features of the end device 12. Importantly, the host microprocessor 28 holds a single media-access control layer (MAC) network address 30 that is used by a single activated one of the ports 22a and 22b as a network address when they are alternatively enabled.

In the preferred embodiment, the host microprocessor 28 authorizes the logic circuit 34 to switch between the ports 22a and 22b after the logic circuit 34 provides an interrupt to the host microprocessor 28 when a fault or other significant network event has occurred. The switching authorization by the host microprocessor 28 requires the execution of very little code so that the host microprocessor 28 may reconfigure the ports with a delay of less than 10 microseconds. During this short switching time, some packets will be lost but higher-level network protocols will function correctly to handle these lost packets just like packets lost due to other network errors. It is unlikely that duplicate packets will be received during this delay period, but if a few duplicate packets are received, they will be detected by higher-level network protocols.

Referring still to FIG. 2, the logic circuit 34 may directly detect faults by two means depending on whether the fault is "local" to the Ethernet interface circuit 20 or "remote", that is, separated from the Ethernet interface circuit 20 by at least one switch 16.

For detecting "remote" faults, the logic circuit 34 preferably includes a beacon generator/detector 35 either providing a means for receiving beacon packets simultaneously on both of ports 22a and 22b (as will be described) or transmitting beacon packet when so configured, on a single activated one of ports 22a and 22b. In this mode, beacon packets will be detected at both of the ports 22a and 22b regardless of which one is active for data transfer.

Generally, when the beacon generator/detector 35 detects failure of any beacon packet to arrive within a predefined timeout period at the active one of ports 22a or 22b, from a remote beacon in the network, the particular port failing to detect the beacon packet is declared to be in fault mode. Upon this occurrence, the logic circuit 34 interrupts the host microprocessor 28, and the host microprocessor 28 instructs the logic circuit 34 to switch to the other port 22 (assuming it has not previously faulted). Similarly, when a faulted port 22 becomes enabled again, it may be restored by the host microprocessor 28 upon interruption by the logic circuit 34. Correct location of one or more beacons thus allows each Ethernet interface circuit 20 to detect remote faults removed from the given communication circuit 20 and the switch 16 to which it connects directly.

The logic circuit 34 may also detect "local" faults, between the Ethernet interface circuit 20 and the closest switch 16 using the mechanisms of IEEE 802.3 standard. These faults are communicated to the host microprocessor 28 like the "remote" faults and treated in a like manner to trigger a change of ports 22a and 22b.

When the beacon generator/detector 35 is configured as a generator it provides a transmission of a beacon packet at a regular interval to aid in the detection of remote faults as described above. The beacon packets are transmitted at highest priority on the network using IEEE 802.3 priority tagged frames, which the switches 16 are configured to support.

In the preferred embodiment, the generator/detector 35 combines these two functions of beacon packet generation and beacon packet detection for efficiency, however, it will be recognized from the following description that the beacon generation function can be performed by a separate device. In the preferred embodiment, the switching circuit 26 communicates with the host microprocessor 28 and the ports 22a and 22b using IEEE 802.3 medium independent interface (MII) bus. The address and data buses of the host microprocessor 28 allows configuration of the logic circuit 34 by the host microprocessor 28 using memory-mapped registers and may provide for the transmission of interrupt signals. The switching circuit 26 may also provide for multi-cast address filtering so that the host microprocessor 28 is not inundated with multi-cast traffic resulting from the disabling of IGMP snooping and filtering in the switches 16.

A Fault-tolerant Network

Figure 3:
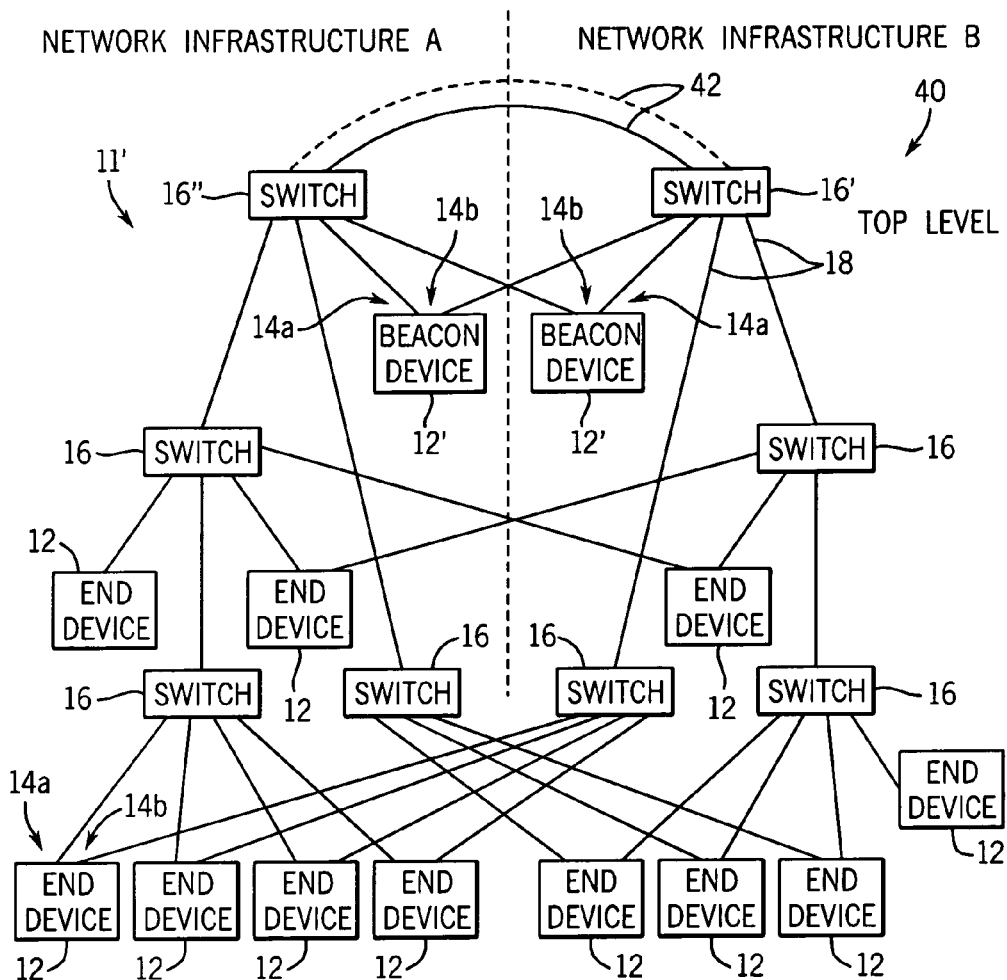
FIG. 3 is a diagram of an Ethernet network configured for use with the present invention connecting multiple end devices redundantly to each of two different backbone switches at a top-level.

Referring now to FIG. 3, although the present invention may work with any network topology providing at least some redundancy, ideally the network is set up for symmetrical redundancy or asymmetrical redundancy with non-overlapping sub-trees, where each end device 12 has one of its connections 14a and 14b connected directly to switches 16 in different ones of two network infrastructure: (1) Network Infrastructure A and (2) Network Infrastructure B. Multiple layers of switches 16 may be employed in each network infrastructure with all connections in each network infrastructure leading to one or the other of two switches 16' and 16" forming a network infrastructure top-level 40. Top-level switches 16' and 16" communicate directly with each other over a backbone 42 incorporating two or more links providing link aggregation capability per IEEE 802.3 Part III "Carrier sense multiple access with collision detection (CSMA/CD) Access Method and Physical Layer Specifications, 2002". With link aggregation capability, traffic is shared among the links between the two top-level switches 16' and 16" so that failure of one line of the backbone 42 will not prevent such communication. With such an arrangement, network infrastructure A and network infrastructure B form a single logical network.

The network 11 so described, provides redundant connections between each end device 12 and switches 16 in both of the Network Infrastructure A and Network Infrastructure B, and ensures highly reliable connections between Network Infrastructure A Network Infrastructure B through the top-level switches 16' and 16". Generally the exact number and level of switches 16 will be dependent on the application requirement. The invention contemplates that extremely large networks may be constructed. For example, with three levels of switches, using eight local links plus one uplink per switch, a network can be constructed with greater than five hundred nodes and with 24 local links plus one uplink per switch, more than 10,000 nodes.

In the preferred embodiment, two end devices 12' are designated solely to provide for beacon packets (via the beacon generator/detector 35) and the remaining end devices 12 are configured to detect the beacon packets so transmitted. The two end devices 12' transmitting beacon packets transmit these packets out of one of their connections 14a and 14b preferably so that one set of beacon packets from one end device 12' goes directly to top-level switch 16' and the other set of beacon packets from the other end device 12' goes directly to top-level switch 16".

As described above, the beacon end devices 12' broadcast a short beacon packet on the network periodically. The periodicity of the beacon packet transmission is determined by a worst-case delay for the beacon packet to travel from a beacon end device 12' to the farthest end device 12 for the specific network 11. This periodicity is programmed into each Ethernet interface circuit 20 so that a timeout measurement may be used by the beacon detectors to determine that the beacon packets have been lost and to declare a fault on the ports 22a or 22b. Normally the time out period is slightly more than twice the worst-case delay to guard against false triggering. For example, for a three-switch level system, such as is shown, the beacon period may be 450 microseconds and the timeout period 950 microseconds, slightly more than two beacon periods.

Example Fault Conditions

Figure 4:
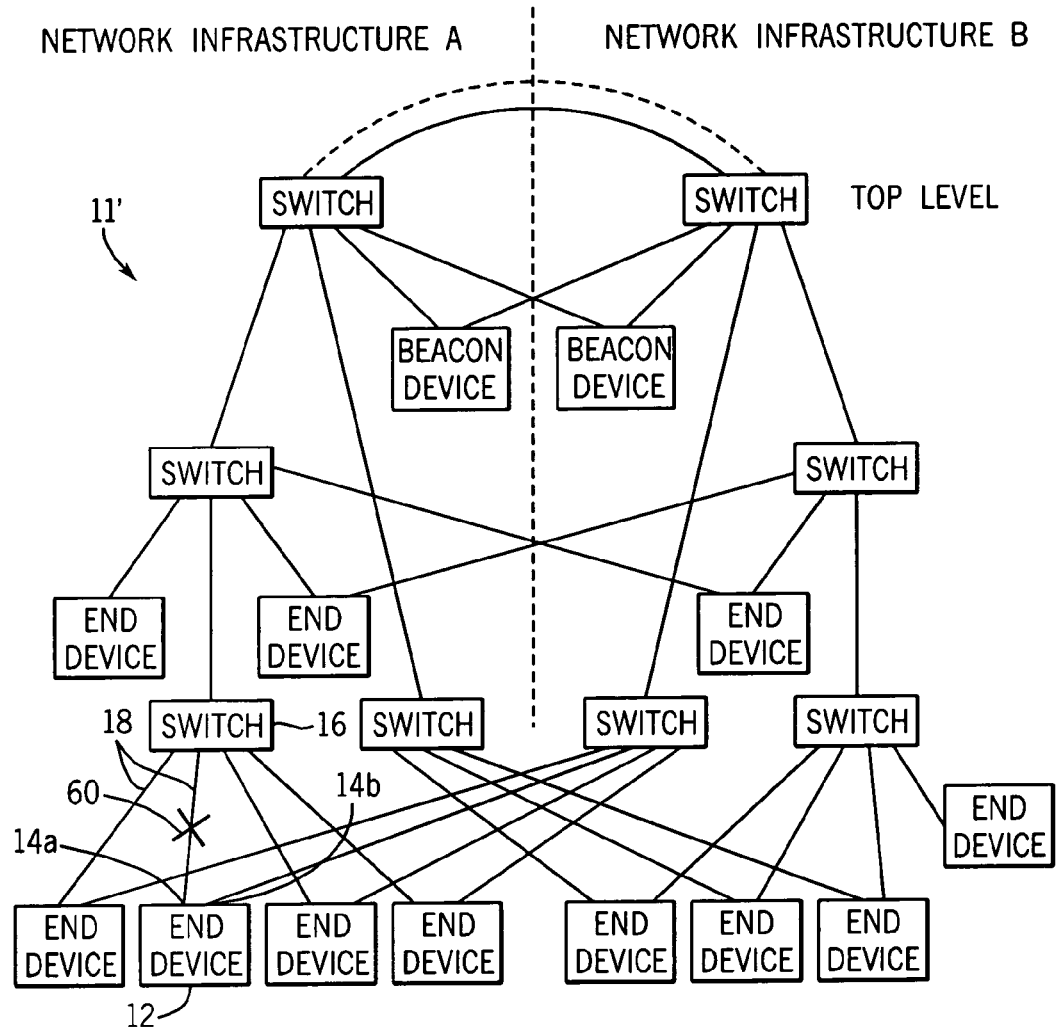
FIG. 4 is a figure similar to that of FIG. 3 showing a single local fault on the network.
Figure 11:
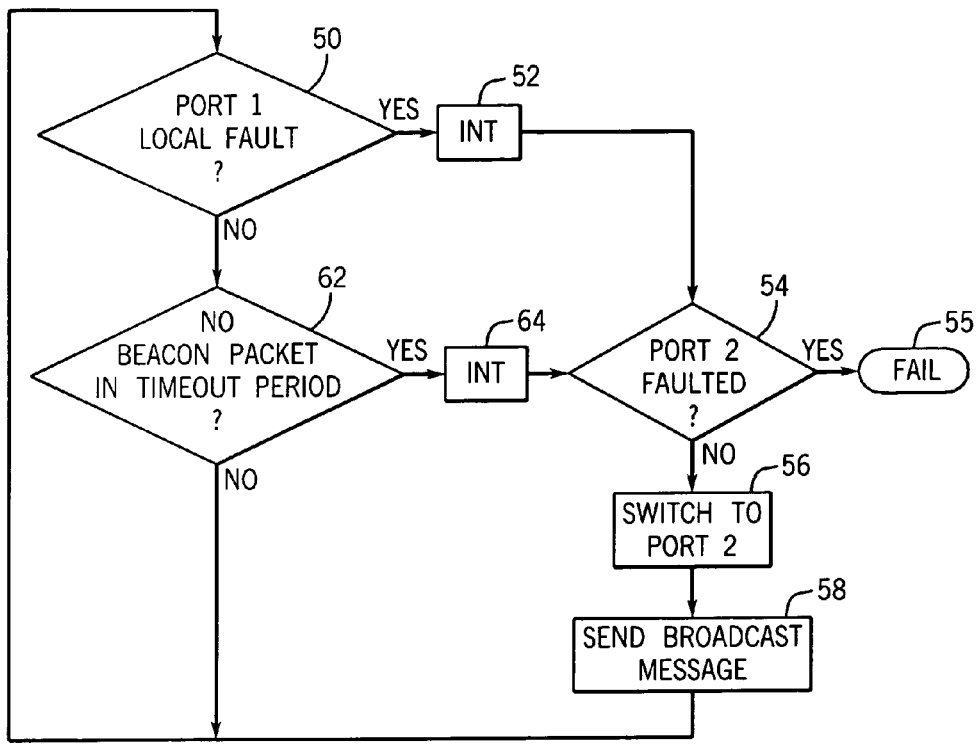
FIG. 11 is flowchart showing operation of the network card of FIG. 2 under fault condition as is implemented in hardware of the communication circuit in the preferred embodiment.

Referring now to FIGS. 2, 4 and 11, a single "local" fault 60 may occur between an end device 12 and the switch 16 to which it is connected on Network Infrastructure A. This failure may be either in the media 18, forming the connection between device 12 and the switch 16, the connectors connecting the media 18 to the switch 16 or end device 12 or individual physical layer electrical interfaces of the switch 16 or end device 12. In this example, it will be assumed that end device 12 connects through connection 14a and port 22a (the first port) to the switch 16.

As shown in FIG. 11, this fault 60 is detected by the logic circuit 34 as indicated at decision block 50 using standard IEEE 802.3 mechanisms that detect such local connection failures. As indicated by process block 52, detection of the fault 60 causes the Ethernet interface circuit 20 to send an interrupt (indicated by process block 52) to the host microprocessor 28. At decision block 54, the logic circuit 34 determines whether the other port 22b is also faulted (meaning that there is a fault somewhere between it and both of the top-level switches) reflected in a failure to receive beacon packets from either beacon or a local fault. If so, a failure is reported at process block 55 and the network has failed under a double fault condition.

More typically, however, the logic circuit 34 will determine at decision block 54 that the other port 22b has not faulted and the Ethernet interface circuit 20 will switch to port 22b as indicated by process block 56 while disabling port 22a. At succeeding process block 58, the Ethernet interface circuit 20 sends out a short broadcast message that allows for learning by intervening switches.

At this point, the network continues to operate with the end device 12, however, communicating through connection 14b and port 22b. As discussed above, should port 22a have its fault corrected, communication through port 22a may be resumed.

Figure 5:
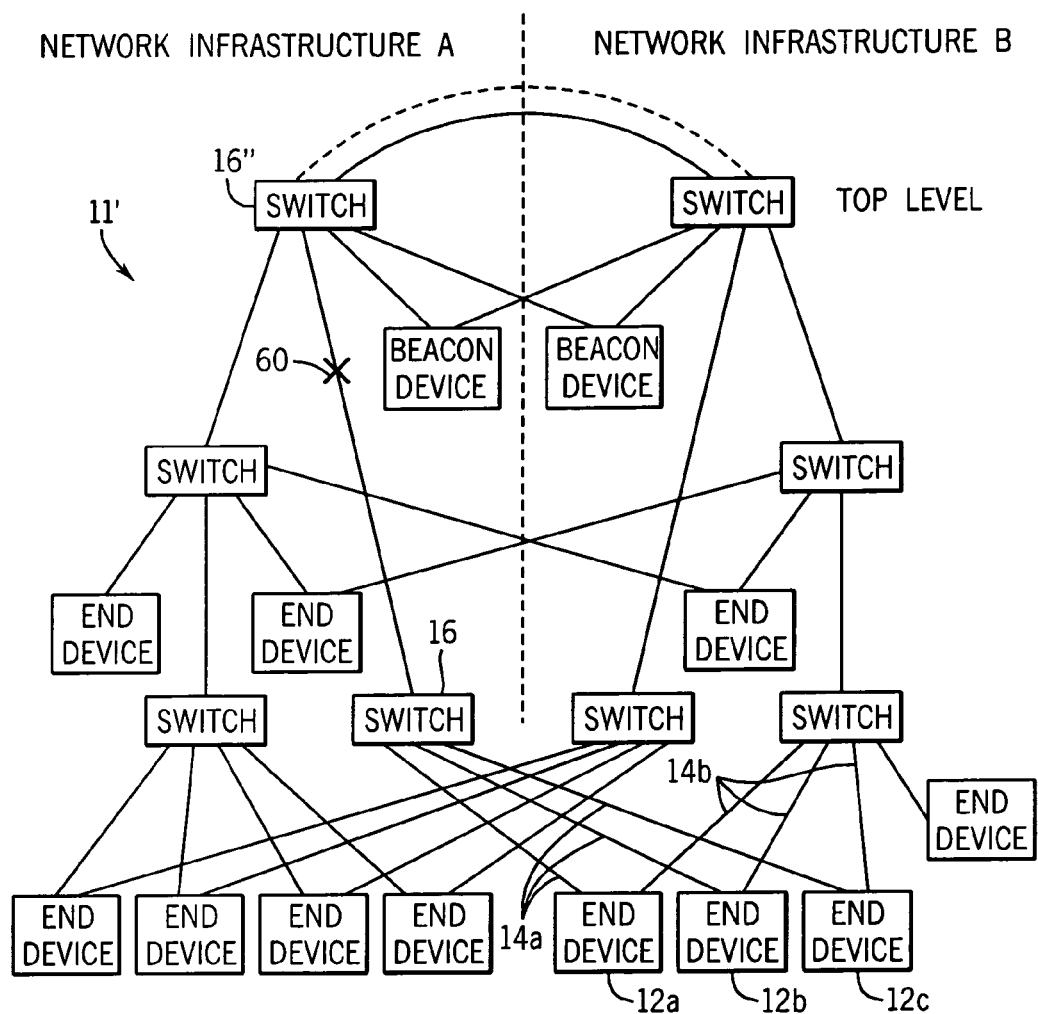
FIG. 5 is a figure similar to that of FIG. 4 showing a single remote fault on the network.

Referring now to FIGS. 2, 5 and 11, in a second case, fault 60 may be located between switch 16 and top-level switch 16', the former switch 16 serving a number of end devices, 12a-12c. As before, it will be assumed that each of these devices, 12a-12c, communicates with the network 11 via its connection 14a and port 22a at the time of the fault. With this fault, the end devices 12a-12c cannot directly detect failure per decision block 50 but must deduce a remote failure from the missing beacon packets normally passing through switch 16 per decision block 62 when no beacon packet is received within predefined timeout period. When such a remote fault is detected, the logic circuit 34 proceeds to process block 64 and an interrupt is sent to the host microprocessor 28 causing again the ports to switch from port 22a-22b per process blocks 54, 56, and 58 for each of the end devices 12a through 12c.

Figure 6:
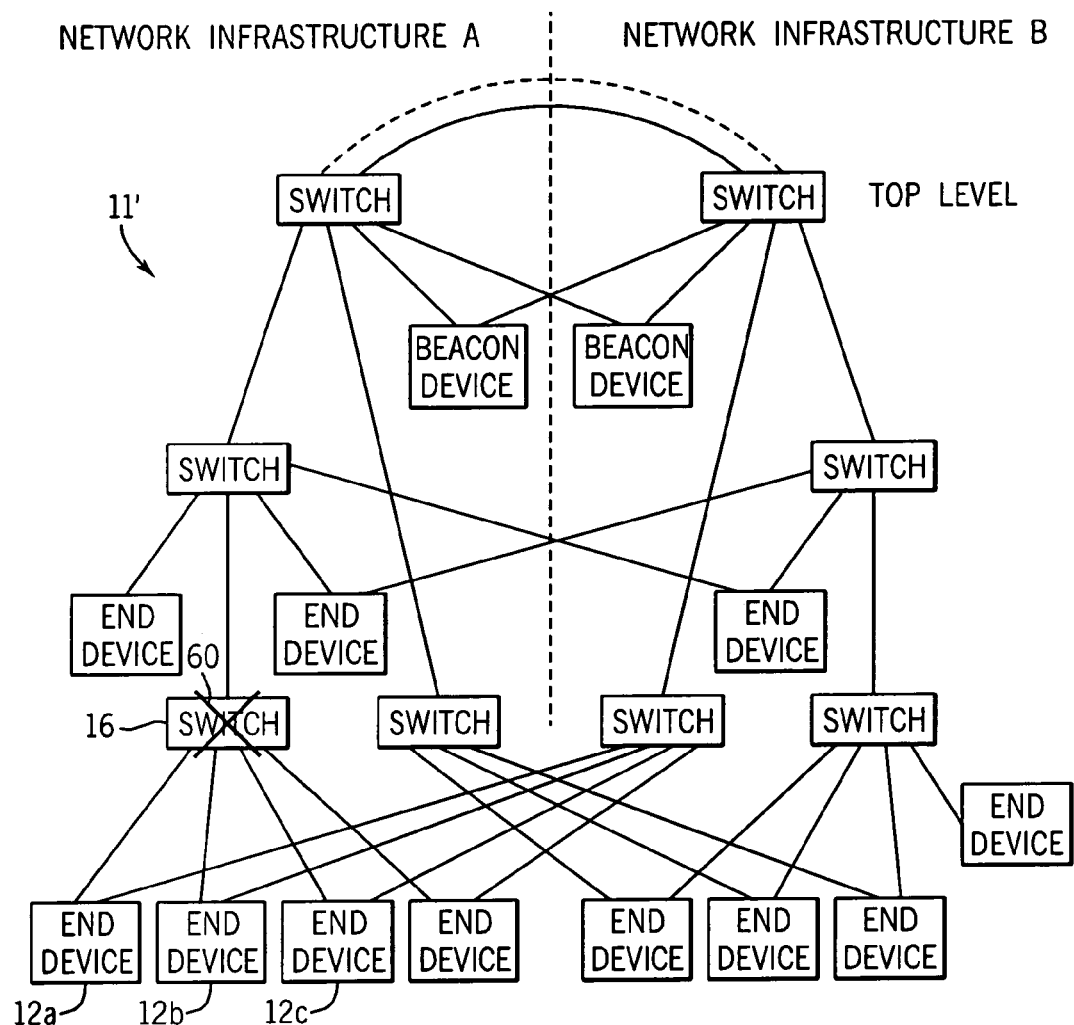
FIG. 6 is a figure similar to that of FIG. 5 showing switch failure.

Referring now to FIGS. 2, 6 and 11, a fault on a switch 16 connected directly to end devices 12a, 12b and 12c internal to the switch may not be detectable as a local fault per decision block 50 through IEEE 802.3 standard mechanisms, however, it will be detected by loss of the beacon packets as described above per decision block 62. The logic circuit 34 proceeds to process block 64 and an interrupt is sent to the host microprocessor 28 causing again the ports to switch from port 22a-22b per process blocks 54, 56, and 58 for each of the end devices 12a through 12c. It should be noted that if the fault were to occur on a top-level switch 16' or 16" all of the end devices 12 would switch over to Network Infrastructure B and the system would continue to operate.

Figure 7:
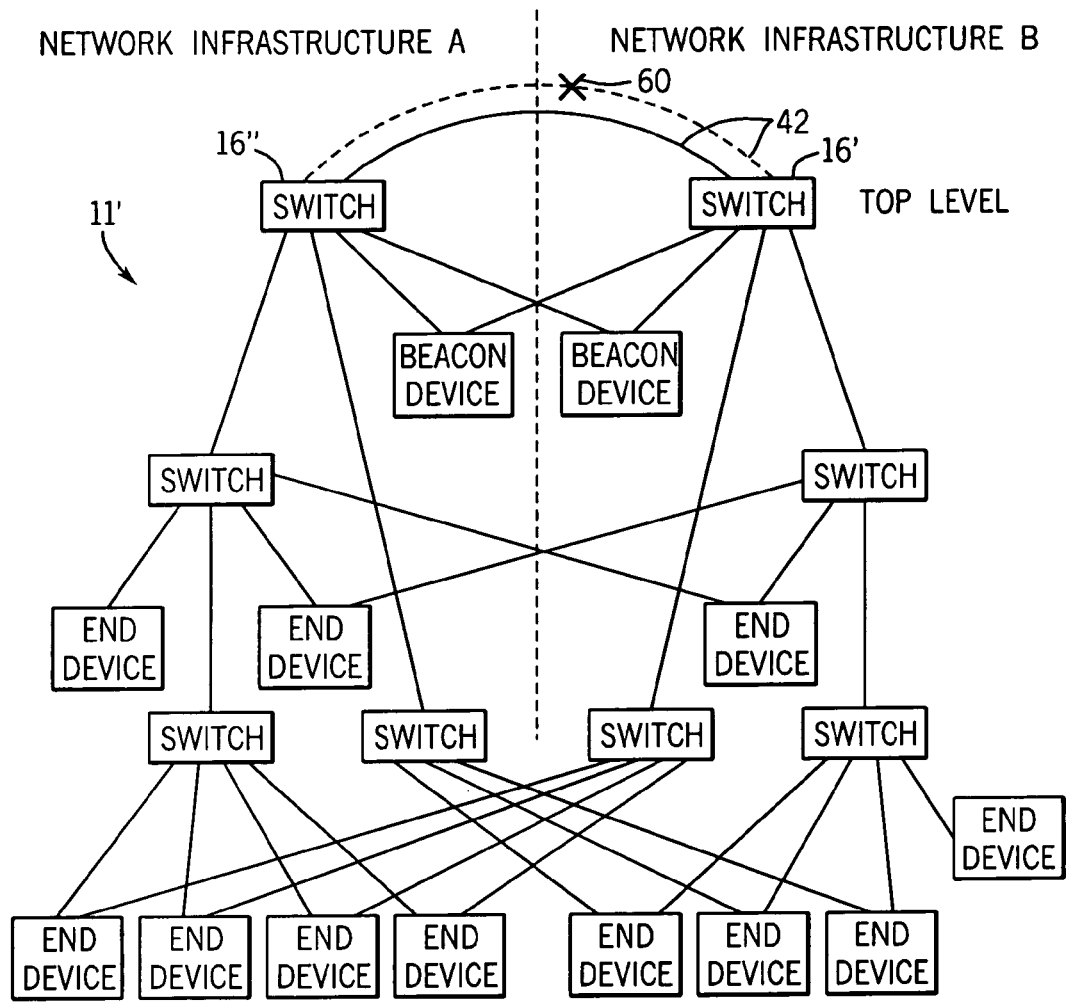
FIG. 7 is a figure similar to that of FIG. 6 showing an interconnection failure between backbone switches.

Referring now to FIGS. 2, 7, and 11, a fault 60 may occur on the network backbone 42. Such a fault is handled by the link aggregation procedure described above being a standard portion of the IEEE 802.3.

Figure 8:
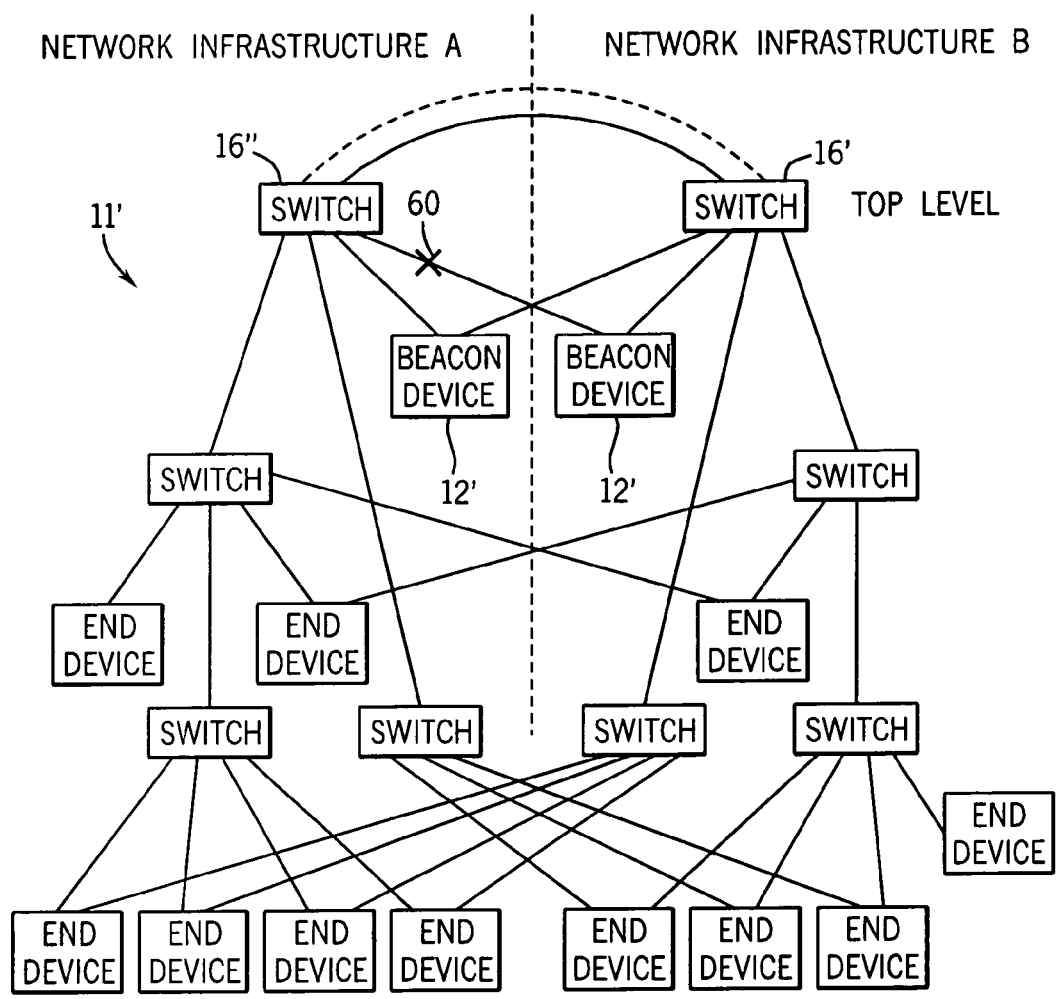
FIG. 8 is a figure similar to that of FIG. 7 showing a local failure affecting a beacon.

Referring now to FIGS. 2, 8 and 11, a single fault may occur between a beacon end device 12' and a top-level switch 16" of the backbone. Because the fault is on the immediate link to the beacon end device 12' and the top-level switch 16", the beacon end device 12' will detect it immediately per decision block 50 and begin transmitting to switch 16'. The switch 16' will relay beacon signals through switch 16" to Network Infrastructure A.

Figure 9:
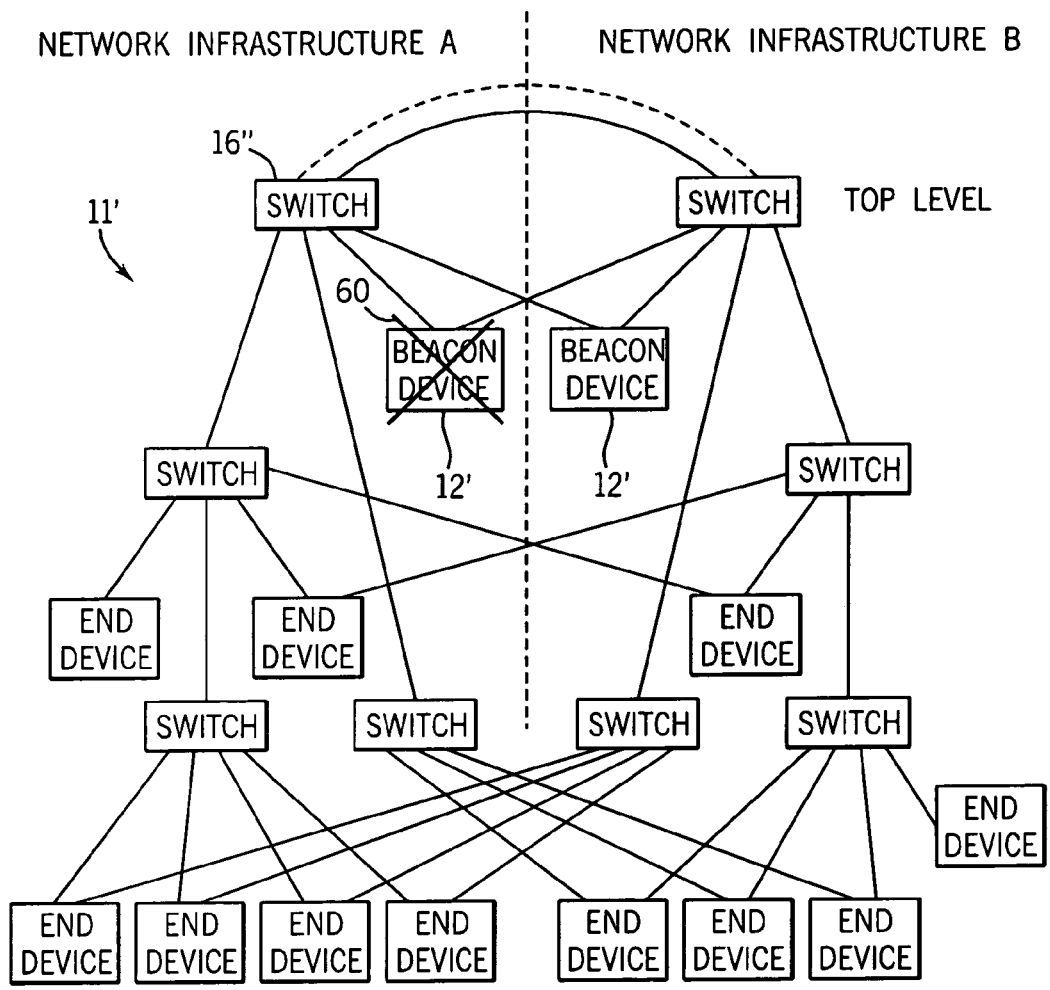
FIG. 9 is a figure similar to that of FIG. 8 showing failure of a beacon.

Finally, as shown in FIGS. 2, 9 and 11, beacon end device 12' communicating with switch 16" may itself fail. Because the other beacon end device 12' is still active, however, the system will continue to operate without any problems with beacon pulses being transmitted, for example, from beacon end device 12' to switch 16' then to switch 16" for distribution over the Network Infrastructure A.

Figure 10:
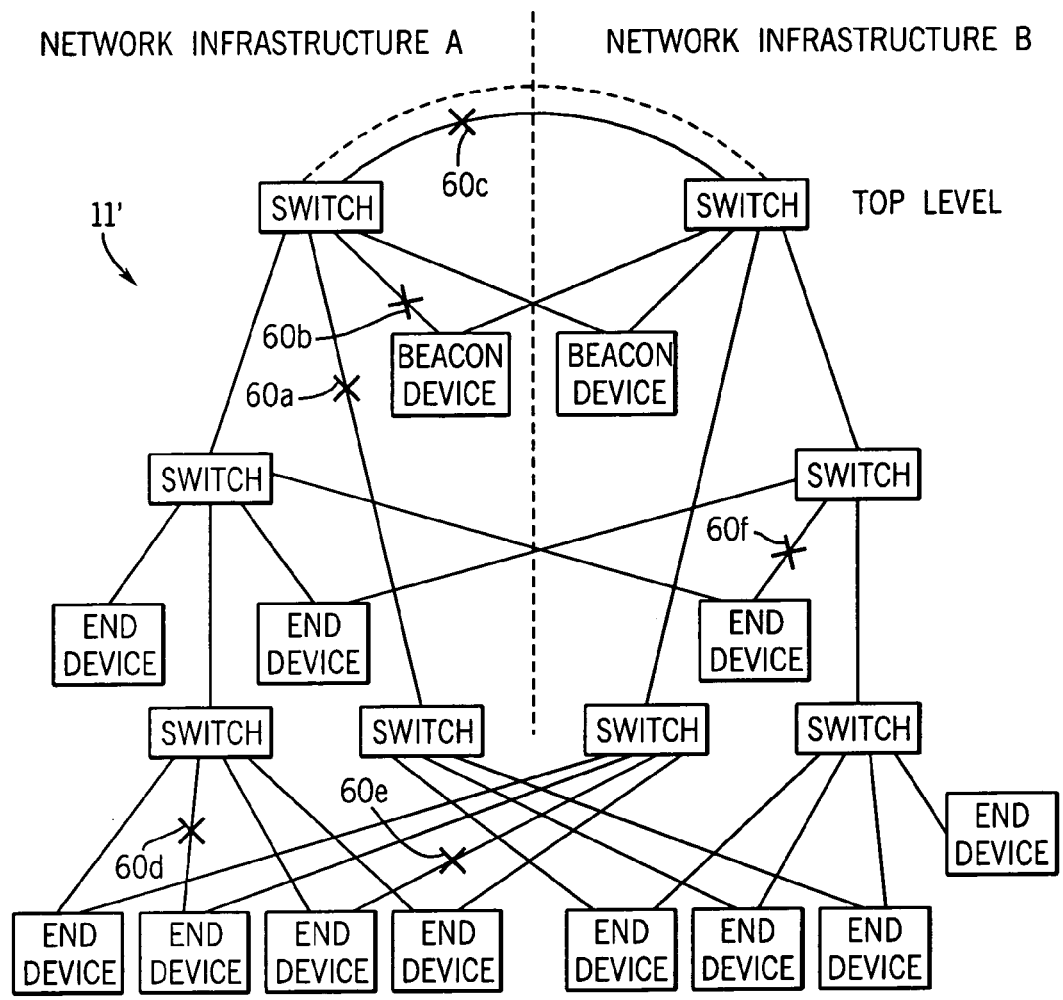
FIG. 10 is a figure similar to that of FIG. 9 showing multiple faults.

Referring to FIGS. 2, 10 and 11, it will be understood from the above description that the present invention can handle all single faults and all combinations of multiple single faults with 60a-60f as shown being one such combination.

Figure 12:
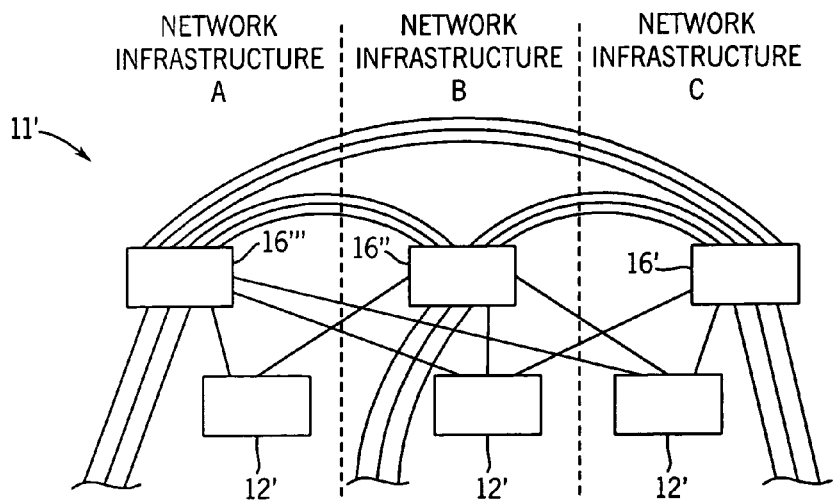
FIG. 12 shows a fragmentary view similar to that of FIG. 10 of an extension of the present invention to provide multiple redundancy.

Referring now to FIG. 12, the present invention has been described for clarity with respect to two Network Infrastructures A and B, however, as will be understood from the above description, the invention can be readily expanded to an arbitrary number of networks infrastructures, for example, a Network Infrastructure A, B and C having top-level switches 16', 16" and 16''' and three beacon end devices 12' associated with each infrastructure division. Again this network 11' is a single network with each end device 12 (not shown) having a unique address on the network. With three network infrastructures, all single faults, all double faults and all combinations of multiple single and double faults can be tolerated.

It would be understood from this description, that forwarding of multicast packets in switches 16 could be affected by IGMP snooping and filtering. Accordingly, if IGMP snooping and filtering is turned on, the switches 16 in the system will have invalid knowledge after reconfiguration of an end device changing port 22a and 22b. This will cause multicast packets to be forwarded to the wrong ports and reconfigured ports will not receive those packets. For this reason, as described above, IGMP snooping and filtering is turned off in switches 16.

Unicast packets are affected by learning and filtering features that may be incorporated into the switches 16. After a reconfiguration (i.e., switching from ports 22a to 22b), switches 16 will have invalid knowledge. Nevertheless, a switch 16, implementing learning correctly, will update its database when a packet with a learned MAC address in a source field is received on a different port from the learned port stored in the database. For this reason, as noted above, when an end device 12 reconfigures its ports, it sends out a short broadcast message per process block 58 of FIG. 11. This broadcast packet is of no interest to other end devices and will be dropped.

Some switches 16 also provide configurable aging mechanisms for learned addresses. This feature may also be used as a fallback mechanism to facilitate rapid reconfiguration.

It is specifically intended that the present invention not be limited to the embodiments and illustrations contained herein, but include modified forms of those embodiments including portions of the embodiments and combinations of elements of different embodiments as come within the scope of the following claims.

We claim:

1. A system for creating a fault-tolerant Ethernet network of end devices connected by network switches and network media, the system comprising:
    Ethernet communication circuits associated with each end device and communicating between a host microprocessor of the end device and at least two ports using a common MAC address and connected to different network media leading to different switches, the communication circuit switchably connecting the end device to a second of the ports upon occurrence of a fault affecting a first of the ports without remapping of MAC addresses; both ports concurrently detecting network-level faults regardless of which is switchably connected to the end device; and
    at least one beacon transmitting a beacon packet over the network media to the first port and wherein the Ethernet communication circuit detects a fault affecting the first of the ports by detecting a loss of all the beacon packets within a predefined timeout period at the first port.

2. The system of claim 1 wherein the Ethernet communication circuits detect a fault affecting the first of the ports both by detecting a local failure of Ethernet communication with a first network switch directly connected to the first port and by detecting a remote failure of Ethernet communications with a network switch not directly connected with the first port.

3. The system of claim 1 wherein the beacon packet is retransmitted at a periodic rate and the predefined timeout period for detecting loss of all beacon packets at a port is deduced from the periodic rate.

4. The system of claim 1 wherein the Ethernet communication circuit also includes a beacon selectively actuated by a user to transmit a beacon packet over the network media to other Ethernet communication circuits.

5. The system of claim 1 wherein beacons transmit at the highest priority under IEEE 802.3.

6. The system of claim 1 wherein the Ethernet communication circuits broadcast a packet to other Ethernet communication circuits when the communication circuit switches between ports to promote learning.

7. The system of claim 1 wherein the Ethernet communication circuits includes a hardware circuit switching between ports.

8. A fault-tolerant Ethernet network comprising:
    a set of end devices intercommunicating via network connections to network switches through network media;
    wherein at least some of the end devices have Ethernet communication circuits communicating between host microprocessors of the end devices and at least two ports the ports of each end device using a single MAC address provided by the host microprocessor and connected to different network media leading to different switches, the Ethernet communication circuits switchably connecting the end devices to a second of the ports upon occurrence of a fault affecting a first of the ports;
    wherein at least two of the switches are designated top-level switches and communicate with each other via a fault-tolerant backbone;
    wherein each end device communicates directly or indirectly with a first of the top-level switches via one port and with a second of the top-level switches via the second port and
    at least two beacons transmitting a beacon packet over the network media; each beacon connected directly to one of the top-level switches; wherein a fault is detected by an absence of any beacon packet within predefined timeout period at a port.

9. The fault-tolerant Ethernet network of claim 8 wherein the top-level switches provide IEEE 802.3 link aggregation capability.

10. The fault-tolerant Ethernet network of claim 8 wherein each beacon connects to multiple top-level switches.

11. The system of claim 8 wherein the beacon packet is retransmitted at a periodic rate having a period greater than a greatest time required for a signal to propagate between the beacons and the farthest end devices from them on the network.

12. The system of claim 8 wherein the Ethernet communication circuit also includes a beacon selectively actuated by a user to transmit a beacon packet over the network media to other Ethernet communication circuits.

13. The system of claim 8 wherein beacons transmit at the highest priority under IEEE 802.3.

14. The system of claim 8 wherein the Ethernet communication circuits broadcast a packet to other Ethernet communication circuits when the communication circuit switches between ports to promote learning.

15. The system of claim 8 wherein the Ethernet communication circuits includes a hardware circuit switching between ports.

16. A method of creating a fault-tolerant network comprising the steps of:

(a) providing a set of end devices having communication circuits connecting host microprocessor of each end device to at least two ports having an identical MAC address;
(b) connecting the end devices via network switches and network media to different ones of at least two switches designated as top-level switches and communicating with each other via a fault-tolerant backbone wherein each end device communicates directly or indirectly with a first of the top-level switch via one port and with a second of the top-level switches via the second port;
(c) attaching at least two beacons to the network, the beacons transmitting beacon packets over the network media; each beacon connected directly to one of the top-level switches; wherein a fault is detected by an absence of any beacon packet within a predefined timeout period at a port; and
(d) upon occurrence of a fault affecting a first of the ports of any communication circuit, switching the end device to a second of the ports.

17. The method of claim 16 wherein each given communication circuit broadcasts a packet to other communication circuits when the given communication circuit switches between ports to promote learning.

* * * * *